US005864614A

United States Patent [19]
Farris et al.

[11] Patent Number: 5,864,614
[45] Date of Patent: Jan. 26, 1999

[54] INTELLIGENT PERIPHERAL AND NETWORK CONTROL

[75] Inventors: Robert D. Farris, Sterling, Va.; Michael J. Strauss, Potomac, Md.

[73] Assignee: Bell Atlantic Network Services, Inc., Arlington, Va.

[21] Appl. No.: 678,725

[22] Filed: Jul. 11, 1996

Related U.S. Application Data

[63] Continuation-in-part of Ser. No. 248,980, May 25, 1994, Pat. No. 5,572,583, which is a continuation-in-part of Ser. No. 869,931, Apr. 17, 1992, Pat. No. 5,418,844.

[51] Int. Cl.⁶ .................................................. H04M 3/42
[52] U.S. Cl. .......................... 379/207; 379/201; 379/112; 379/229
[58] Field of Search ................................... 379/201, 207, 379/220, 221, 229, 230, 112

[56] References Cited

U.S. PATENT DOCUMENTS

| | | | |
|---|---|---|---|
| 3,600,522 | 8/1971 | Benson | 379/67 |
| 4,162,377 | 7/1979 | Mearns | 379/207 |
| 4,191,860 | 3/1980 | Weber | 379/207 |
| 4,313,035 | 1/1982 | Jordan et al. | 379/210 |
| 4,554,418 | 11/1985 | Toy | 379/88 |
| 4,598,367 | 7/1986 | DeFrancesco et al. | 364/408 |
| 4,611,094 | 9/1986 | Asmuth et al. | 379/207 |
| 4,611,096 | 9/1986 | Asmuth et al. | 379/207 |
| 4,656,651 | 4/1987 | Evans et al. | 379/1 |
| 4,677,552 | 6/1987 | Sibley, Jr. | 364/408 |
| 4,756,020 | 7/1988 | Fodale | 379/112 |
| 4,757,267 | 7/1988 | Riskin | 379/113 |
| 4,763,191 | 8/1988 | Gordan et al. | 358/86 |
| 4,763,353 | 8/1988 | Canale et al. | 379/157 |
| 4,769,834 | 9/1988 | Billinger et al. | 379/112 |
| 4,788,718 | 11/1988 | McNabb et al. | 379/113 |
| 4,817,129 | 3/1989 | Riskin | 379/80 |
| 4,827,500 | 5/1989 | Binkerd et al. | 397/88 |
| 4,878,240 | 10/1989 | Lin et al. | 379/67 |

(List continued on next page.)

OTHER PUBLICATIONS

Helen A. Bauer et al., "Designing Service–Independent Capabilities for Intelligent Networks", IEEE Communications Magazine, Dec. 1988, pp. 31–41.

IBM View of Intelligent Network Architecture Evolution, Dr. H. Forner, ICIN, 1990, pp. 169–171.

Unisys Synthesis: A Gateway for Audiotex, Robert W. Lawson; Telephony, Jan 16, 1989, pp. 39–41.

The Intelligence Network and Forward–Looking Technology, Frank J. Weisser and Randall L. Corn; IEEE Comm. Mag., Dec.1988, pp. 64–69.

Voice Storage Services, Tetsuya Isayama and Takeshi Mochizuki; JTR, Oct. 1986, pp. 271–280.

Application of a New Network Concept for Faster Service Deployment, J. Shah and K. Prescher; IEEE, 1988, pp. 1327–1331.

Berman et al., "Perspectives on the AIN Architecture", Feb. 1992, IEEE Communications Magazine, pp. 27–32.

*Primary Examiner*—Daniel S. Hunter
*Attorney, Agent, or Firm*—McDermott, Will & Emery

[57] ABSTRACT

A telecommunications network incorporating an Advanced Intelligent Network having a service control point including a centralized database and having a peripheral platform comprising an Intelligent Peripheral providing at least one auxiliary call processing capability. The service control point is in communication with a network switching system via a common channel signaling communication network. The peripheral platform is in communication with the service control point over a second data connection and is in communication with switching systems in the network switching system over F links and voice channels. The individual switching systems are in connection with one another through F links. The peripheral platform is capable of call management which obviates the necessity of using the common channel signaling system to accomplish the same call management. The service control point is arranged to act proactively to issue instructions to the peripheral platform to expedite call management.

23 Claims, 9 Drawing Sheets

U.S. PATENT DOCUMENTS

| | | | |
|---|---|---|---|
| 4,879,743 | 11/1989 | Burke et al. | 379/142 |
| 4,893,335 | 1/1990 | Fuller et al. | 379/200 |
| 4,899,373 | 2/1990 | Lee et al. | 379/207 |
| 4,922,519 | 5/1990 | Daudelin | 379/67 |
| 4,926,471 | 5/1990 | Ikeda | 379/216 |
| 4,942,616 | 7/1990 | Linstroth et al. | 381/51 |
| 4,943,995 | 7/1990 | Daudelin et al. | 379/67 |
| 4,953,203 | 8/1990 | Shepard | 379/207 |
| 4,996,704 | 2/1991 | Brunson | 379/67 |
| 5,018,191 | 5/1991 | Catron et al. | 379/100.15 |
| 5,027,384 | 6/1991 | Morganstein | 379/67 |
| 5,029,196 | 7/1991 | Morganstein | 379/67 |
| 5,029,199 | 7/1991 | Jones et al. | 379/89 |
| 5,033,079 | 7/1991 | Catron et al. | 379/100.01 |
| 5,046,183 | 9/1991 | Dorst et al. | 379/144 |
| 5,109,405 | 4/1992 | Morganstein | 379/89 |
| 5,133,004 | 7/1992 | Heileman, Jr. et al. | 379/67 |
| 5,150,464 | 9/1992 | Sidhu et al. | 395/200 |
| 5,153,907 | 10/1992 | Pugh et al. | 379/143 |
| 5,182,766 | 1/1993 | Garland | 379/216 |
| 5,193,110 | 3/1993 | Jones et al. | 379/94 |
| 5,204,894 | 4/1993 | Darden | 379/88 |
| 5,206,899 | 4/1993 | Gupta et al. | 379/120 |
| 5,206,901 | 4/1993 | Harlow et al. | 379/211 |
| 5,208,848 | 5/1993 | Pula | 379/67 |
| 5,212,727 | 5/1993 | Ramkumar | 379/221 |
| 5,222,120 | 6/1993 | McLeod et al. | 379/88 |
| 5,222,122 | 6/1993 | Hamilton et al. | 379/32 |
| 5,222,125 | 6/1993 | Creswell et al. | 379/67 |
| 5,247,571 | 9/1993 | Kay et al. | 379/207 |
| 5,259,026 | 11/1993 | Johnson | 379/207 |
| 5,272,748 | 12/1993 | Davis | 379/63 |
| 5,353,331 | 10/1994 | Emery et al. | 379/58 |
| 5,392,402 | 2/1995 | Robrock, II | 395/200 |
| 5,418,844 | 5/1995 | Morrisey et al. | 379/207 |
| 5,469,500 | 11/1995 | Satter et al. | 379/201 |

INTELLIGENT PERIPHERAL AND NETWORK CONTROL

CROSS-REFERENCE TO RELATED APPLICATION

This application is a continuation-in-part of U.S. patent application Ser. No. 08/248,980, filed May 25, 1994 (attorney docket no. 680-076), now U.S. Pat. No. 5,572,583, which is a continuation-in-part of application Ser. No. 07/869,931 filed on Apr. 17, 1992 (attorney docket no. 680-045), now U.S. Pat. No. 5,418,844, issued May 23, 1995, the disclosures of which are entirely incorporated herein by reference.

TECHNICAL FIELD

The present invention relates to an Advanced Intelligent Network controlled by a centralized database and having a new network node, referred to as an Intelligent Peripheral, in communication with a network switching system and with the central database in a new architecture.

ACRONYMS

The written description uses a large number of acronyms to refer to various services and system components. Although generally known, use of several of these acronyms is not strictly standardized in the art. For purposes of this discussion, acronyms therefore will be defined as follows:

Advanced Intelligent Network (AIN)
Central Office (CO)
Common Channel Inter-office Signaling (CCIS)
Data and Reporting System (DRS)
Generic Data Interface (GDI)
Integrated Service Control Point (ISCP)
Integrated Services Digital Network (ISDN)
Intelligent Peripheral (IP)
Maintenance and Operations Center (MOC)
Multi-Services Application Platform (MSAP)
Service Control Point (SCP)
Service Creation Environment (SCE)
Service Management System (SMS)
Service Switching Point (SSP)
Signaling Transfer Point (STP)
Simplified Message Desk Interface (SMDI)
Signaling System Number 7 (SS7 )
Transaction Capabilities Applications Protocol (TCAP)

BACKGROUND ART

In recent years, a number of new service features have been provided by an enhanced telephone network, sometimes referred to as an Advanced Intelligent Network (AIN). The increasing realization of the potential for offering a large variety of calling services to a wider population has led local telephone companies (Telcos) to offer an increasing number of such services. Many local carriers currently offer call waiting, call forwarding, and voice mail. Most long distance companies also offer calling services, often through their 800 number services. In addition, the rapid advancements in telephony and heightened consumer demand for calling services have spurred the companies who own telephone switches and networks to design and implement new and more sophisticated services.

Historically telephone service providers have relied on switch vendors (such as AT&T and Northern Telecom) to introduce new services through modifications at the switch level or have requested the addition of such capacities to the switches. However, this approach presents several problems. For example, switch modifications lengthen turnaround time for introducing new services because the local carrier must rely on the switch vendors to update the switch and roll out new services. When the switch vendors finally decide to introduce a new service, the introduction is normally on a national scale, decreasing any chance for differentiation and competition for new services at the local level. In addition, switch manufacturers must rewrite the software that controls the switches to introduce new calling services, further exacerbating the problems of difficult modification and slow introduction of new services.

In response, the industry developed a next generation network design called Advanced Intelligent Network (AIN) architecture. Instead of lumping all calling services into the switch, AIN architecture groups intelligence into one or more peripheral computer systems that can more effectively and efficiently deliver calling services. The concept is to maintain the existing network of generic switches that perform call connection, but to transfer "intelligent" operations to a network control computer. In such a manner, service modification becomes more flexible and efficient and may be applied on an area-wide basis.

In recent years, a number of new service features have been provided by such a control in the form of a so-called "Advanced Intelligent Network" (AIN). In an AIN type system, local and/or toll offices of the public telephone network detect one of a number of call processing events identified as AIN "triggers". For ordinary telephone service calls, there would be no event to trigger AIN processing; and the local and toll office switches would function normally and process such calls without referring to the central database for instructions. An office which detects a trigger will suspend call processing, compile a call data message and forward that message via a common channel interoffice signaling (CCIS) link to an Integrated Service Control Point (ISCP) which includes a Multi-Services Application Platform (MSAP) database. If needed, the ISCP can instruct the central office to obtain and forward additional information.

Once sufficient information about the call has reached the ISCP, the ISCP accesses its stored data tables in the MSAP database to translate the received message data into a call control message and returns the call control message to the office of the network via CCIS link. The network offices then use the call control message to complete the particular call. An AIN type network for providing an Area Wide Centrex service was disclosed and described in detail in commonly assigned U.S. Pat. No. 5,247,571 to Kay et al., the disclosure of which is entirely incorporated herein by reference. In AIN type systems such as disclosed in the Kay et al. Patent, announcement and digit functions may be required for certain specific services. For example, a caller may be prompted by a tone or speech announcement to enter a personal identification number (PIN) before obtaining a selected service or modifying certain stored parameters relating to the subscriber's AIN service. In prior art AIN systems, a switching office of the public telephone network would generate the announcements from some internal platform.

Switch based announcements have a number of serious drawbacks. First the capacity of the internal announcement platforms has been limited, thereby limiting the number and variety of announcements which an AIN service can utilize. As AIN services become more sophisticated, a need arises to provide more announcements than such platforms offer, for example to allow subscribers to customize the announcements for their own personalized services. Adding extra announcement capacity to a number of different telephone switching offices is expensive. Often the needed extra announcement equipment can be obtained only from the original switch vendor, in view of the need for compatibility of such equipment with the switch itself.

Also, any service specific announcements must be loaded onto each switch providing the particular AIN service. Loading new announcements on large numbers of switching systems is time consuming and may require the services of expert personnel provided only by the switch equipment vendor.

Accordingly, a need exists for some platform to provide readily adaptable means to add and change announcements to an AIN, without direct addition of equipment in each central office switching system. The platform should also serve to centralize announcement capabilities to some extent, so that announcement reprogramming does not always require reprogramming some equipment for every single switch through which an enhanced service is offered.

A need also exists to provide a convenient platform to add further equipment to facilitate still further enhanced features, such as services based on speech recognition, mail services, etc., without requiring addition to or modification of equipment within the central office switching systems for each such further enhanced service feature.

Proposals have been made to add nodes to the telephone network, separate from the switching offices, to provide announcements and related enhanced service features. For example, U.S. Pat. No. 4,827,500 to Binkerd et al. discloses an announcement point which provides messages to callers, receives dialed digits and/or speech signals for input information from callers and exchanges appropriate data with a remote central 800 number database. The communication between the announcement point and the 800 database apparently goes through the same interoffice signaling network used in routing of calls between switching offices. Any new or additional messages exchanged between the 800 database and the announcement platform will inherently increase the traffic load on the interoffice signaling network. A substantially similar network is disclosed in Weisser et al., "The Intelligent Network and Forward-Looking Technology," IEEE Communications Magazine, December 1988, pp. 64-69.

U.S. Pat. No. 5,208,848 to Pula teaches connection of one or more Intelligent Peripherals (IPs) to a single switch. Reprogramming announcements for a new service presumably would require reprogramming each IP connected to each switch in the network. Also, although Pula discloses a common channel signaling link to the switch, there is no specific suggestion of any interaction of the IP with a higher level data base. As in the Binkerd et al. Patent, if any interaction with a higher level database were added, the added communication traffic to that database would have to go through the common channel signaling link and would increase traffic loading on that critical link.

U.S. Pat. No. 5,206,901 to Harlow et al. discloses a service circuit node which plays announcements, collects digits and communicates with a Service Control Point (SCP) database to update intelligent network service files. The service circuit node serves a plurality of switching offices, apparently by routing calls through the public switched telephone network to the one service circuit node. As in the Binkerd et al. and Pula systems, the communications between the service circuit node and the SCP apparently go through the switching office directly connected to the service circuit node and the signaling channel which carries queries and responses between that switching office and the SCP, and creates increased traffic on the signaling network. Attention is also directed to Shah et al., "Application of a New Network Concept for Faster et al.," "Application of a New Network Concept for Faster Service Deployment," International Conference on Communications '88, Jun. 12–15, 1988, IEEE Communications Society, Conference Record, Volume 3, pp. 1327–29.

Accordingly, any new node added to the AIN network to offer the enhanced announcement capabilities and other service features, through interactions with the central database, should not increase traffic on the interoffice signaling network and/or the network which carries signaling traffic between the database and the network switching systems, as in the prior art networks.

In addition to the foregoing it is desirable that any new node not impose signaling time burdens on the operation of the network but, on the contrary, provide an architecture and methodology which will alleviate the time delays now encountered in control network functioning. The capacity of the common channel signaling network is presently being subjected to an ever increasing volume of signaling traffic in addition to encountering demands to carry non-network control type signaling of varying types. An example of one such new type of load is a proposal to use the signaling network to carry voice signals, as proposed in a co-pending application of the assignee of the instant application. Accordingly there is a need for the provision of enhanced services, such as through the use of new network nodes, concomitantly with an architecture and methodology which will reduce the load on the conventional common channel signaling system.

DISCLOSURE OF THE INVENTION

The present invention meets the above noted needs by providing a peripheral platform offering one or more auxiliary call processing features. This platform is directly connected to one or more switching systems via service switching points (SSPs) and is in data communication with the service control point (SCP) database. The platform may be a peripheral announcement platform, principally for sending synthesized voice messages and/or receiving dialed digit input information. However in a more advanced preferred implementation, the platform comprises an Intelligent Peripheral (IP) offering a wide array of enhanced auxiliary service features. The platform is connected to the service control point and is preferable also connected to one or more additional nodes in the control network. In still further addition the platform is connected to switch nodes via non-CCIS links. According to one feature of the invention the service control point acts proactively, as contrasted to its conventional reactive role, with the result that the speed of response of an IP or other platform is enhanced. According to another feature of the invention the IP performs call management functions and frees the switch to serve other purposes than the call being managed.

According to the preferred embodiment of the invention the platform is connected to the switch nodes in a system by F links or simulated F links. An F link is a fully associated link used to connect two SS7 signaling points which share a high community of interest and wherein linking may be economically accomplished. F links conventionally provide direct links from one switch node to another. More specifically an F link works off of an SSP connection of an end office switch and goes directly to the SSP connection of another switch or network element. According to the invention F links provide connection between switches and between switches and one or more intelligent peripheral nodes. While an F link may be connected to one or more service transfer points (STPs) this is not necessary according to the invention.

The F link may normally carry SS7 signal protocol but is not limited to that protocol in the methodology of the invention. SS7 is the preferred protocol at least through the third layer or level 3 of the OSI (Open System Interconnect) layer stack. This provides the switches with a known protocol which is accepted and functional. The ability to provide F link signaling directly from SSP to SSP can be used to enhance network speed. This is feasible because the switches are the fastest network elements and are afforded direct communication without routing to STPs or other elements of the common channel signaling system.

According to the invention direct F links may be provided between the SSPs and the IP, and the IP may have an F link to the ISCP. However, according to the preferred embodiment a more generic link is provided between the intelligent peripheral and the service control point. This may be used to provide call management without need to access the STPs and may permit releasing the switch during at least a portion of the management. This not only minimizes the load on the common channel signaling system but also provides more efficient switch usage. The IPs are provided on a regional basis with the IP connected to all or most SSPs in its region by direct F links. In addition the various regional IPs are connected with one another by F links.

Another aspect of the invention relates to a methodology for routing calls to the peripheral platform for service. In one method, a request for service might trigger a procedure for obtaining routing information from the services control point to direct a call to the peripheral platform. Alternatively, certain types of trigger events might cause the switching system to route calls to the peripheral platform directly, without accessing data stored by the database in the services control point.

Two specific architectures for IP versions of the peripheral platform are described. One version uses general purpose computers with appropriate line interfaces. The software run by the computers offers a variety of different enhanced service features, such as voice mail, facsimile mail, voice recognition, etc. The second version includes a number of separate modules for specific identified service features, e.g., a voice recognition server, a voice mail server, a facsimile mail server, etc.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

Figure 1:
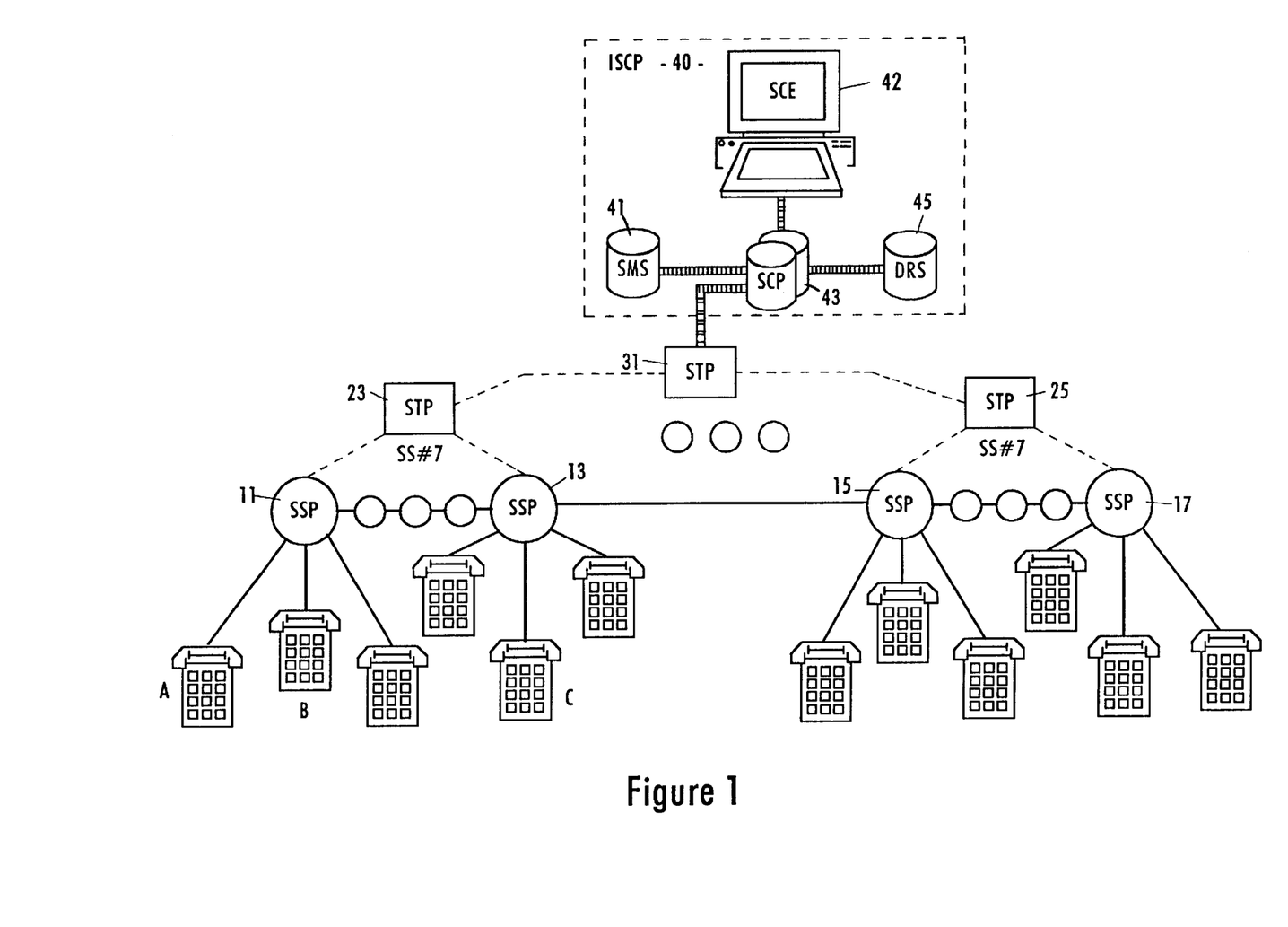
FIG. 1 is a schematic block diagram of the components of an Advanced Intelligent Network system in a telecommunications network.

FIG. 1 is a schematic block diagram of the components of an AIN controlled telecommunication network. In this figure, each of the COs are labeled as an "SSP." The Service Switching Points, referred to as SSPs, are appropriately equipped programmable switches present in the telephone network, which recognize AIN type calls, launch queries to the ISCP and receive commands and data from the ISCP to further process the AIN calls.

SSPs can be programmed to recognize a number of different triggers as an indication that a call is an AIN call. The trigger can relate to the terminating station, but in certain types of service, such as Area Wide Centrex the trigger is typically the identification of the telephone line from which a call or other request for service originates. Generally, for Area Wide Centrex, a number of lines are designated as members of a business group serviced by the Area Wide Centrex. The SSPs then trigger AIN type servicing based on origination of the call or service request from a line designated as a member of one of the business groups subscribing to Area Wide Centrex.

As shown in FIG. 1, all of the COs 11, 13, 15 and 17 are equipped and programmed to serve as SSPs. Such central office switching systems typically consist of a programmable digital switch with CCIS communications capabilities. One example of such a switch is a 5ESS type switch manufactured by AT&T; but other vendors, such as Northern Telecom and Seimens, manufacture comparable digital switches which could serve as the SSPs. The illustrated embodiment is perhaps an ideal implementation; other implementations provide the SSP functionality only at selected points in the network, and end offices without such functionality forward calls to one of the SSPs.

The Area Wide Centrex implementation of FIG. 1 includes a number of the SSP capable CO switches, such as the SSPs shown at 11, 13, 15, and 17. The SSP type central offices are each at a different location and distributed throughout the area, region or country served by the Area Wide Centrex system. In the example of FIG. 1, each of the COs would comprise an SSP type central office switching system.

The SSPs 11 and 13 connect to a first local area STP 23, and the SSPs 15 and 17 connect to a second local area STP 25. The connections to the STPs are for signaling purposes. As indicated by the circles below STPs 23 and 25, each local area STP can connect to a large number of the SSPs (connections not shown in FIG. 1). In FIG. 1, the central offices or SSPs are interconnected to each other by trunk circuits (shown in the drawing as solid lines) for carrying telephone services.

The local area STPs 23 and 25, and any number of other such local area STPs (shown as circles between STPs 23 and 25 in FIG. 1), communicate with a state or regional STP 31. The state or regional STP 31 in turn provides communications with the ISCP 40. The STP hierarchy can be expanded or contracted to as many levels as needed to serve any size area covered by the Area Wide Centrex and to service any number of stations and central office switches. The links 23 and 25 between the COs and the local area STPs are dedicated CCIS links, typically SS7 type interoffice data communication channels. The local area STPs are in turn connected to each other and to the regional STP 31 via a packet switched network. The regional STP 31 also communicates with the ISCP 40 via a packet switched network.

The messages transmitted between the SSPs and the ISCP are all formatted in accord with the Transaction Capabilities Applications Protocol (TCAP). The TCAP protocol provides standardized formats for various query and response messages. Each query and response includes data fields for a variety of different pieces of information relating to the current call. Of particular note here, an initial TCAP query from the SSP includes, among other data, a "Service Key" which is the calling party's address and digits representing the called party address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" responses for instructing the SSP to play an announcement or to play an announcement and collect digits.

As shown in FIG. 1, the ISCP 40 is an integrated system. Among other system components, the ISCP 40 includes a Service Management System (SMS) 41, a Data and Reporting System (DRS) 45 and the actual data base or Service Control Point (SCP) 43. The ISCP also typically includes a terminal subsystem referred to as a Service Creation Environment or SCE 42 for programming the data base in the SCP 43 for the services subscribed to by each individual business customer.

Each central office switching system normally responds to a service request on a local communication line connected thereto to selectively connect the requesting line to another selected local communication line. The connection can be made locally through only the connected central office switching system. For example, for a call from station A to station B the SSP 11 provides the call connection without any connection to another central office. When the called line connects to a distant station, for example when station A calls station C, the connection is made through the connected central office switching system SSP 11 and at least one other central office switching system SSP 13 through the telephone trunks interconnection the two COs.

Figure 2:
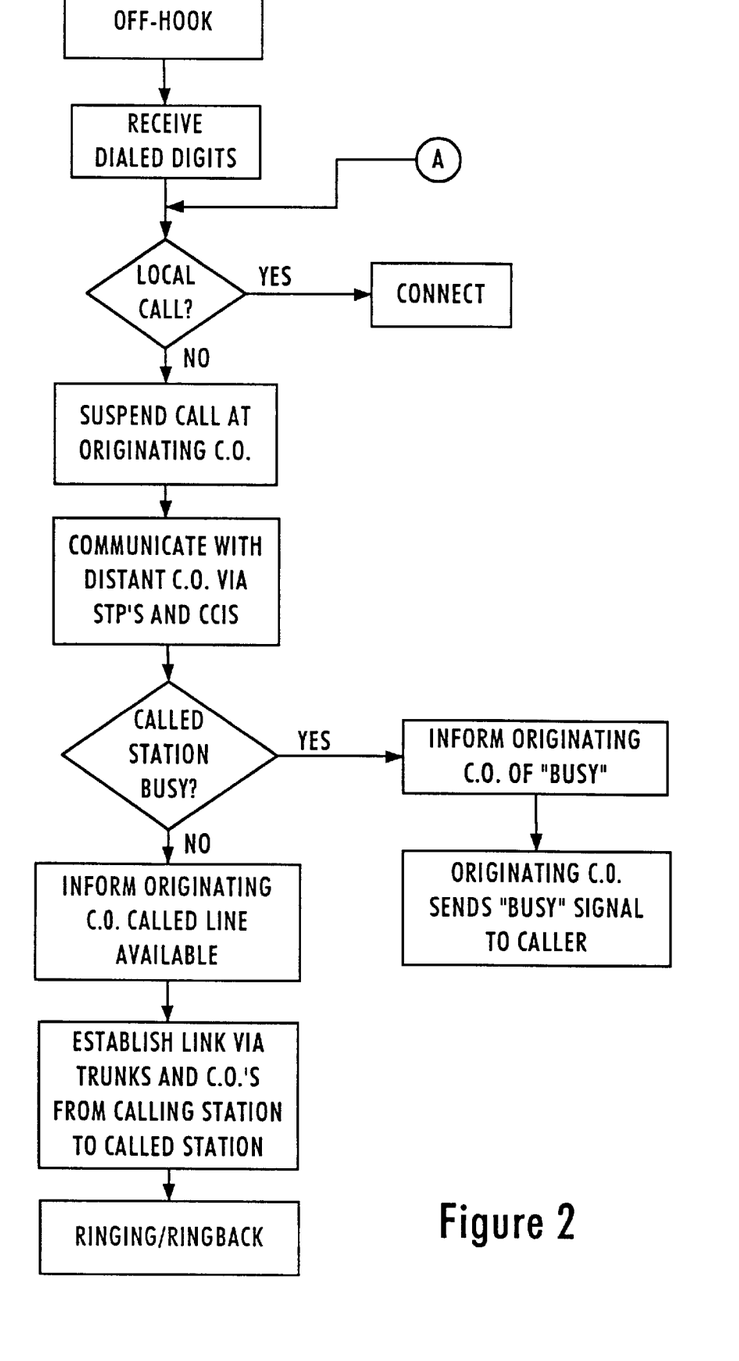
FIG. 2 is a flow chart depicting the routine for normal call processing in a network having AIN control.

FIG. 2 illustrates in simplified flow chart for a routine for such normal call processing. This routine is similar to that used in existing networks to complete calls between stations connected to different central offices and illustrates a basic CCIS function. In an AIN system implementing Area Wide Centrex service, this normal call processing routine would still be executed for completion of calls originating from stations not subscribing to the Area Wide Centrex service.

In the method shown in FIG. 2, the central office switching system responds to an off-hook and receives dialed digits from the calling station. The central office switching system analyzes the received digits to determine if the call is local or not. If the called station is local and the call can be completed through the one central office, the central office switching system connects the calling station to the called station. If, however, the called station is not local, the call must be completed through one or more distant central offices, and further processing is necessary.

If at this point the call were connected serially through the trunks and appropriate central offices between the caller and the called party using in channel signaling, the trunks would be engaged before a determination is made that the called line is available or busy. Particularly if the called line is busy, this would unnecessarily tie up limited trunk capacity. The CCIS system through the STPs was developed to alleviate this problem.

In the CCIS type call processing method illustrated in FIG. 2, the local central office suspends the call and sends a query message through one or more of the STPs. The query message goes to the central office to which the called station is connected. The receiving central office determines whether or not the called station is busy. If the called station is busy, the receiving central office so informs the originating central office which in turn provides a busy signal to the calling station. If the called station is not busy, the receiving central office so informs the originating central office. A telephone connection is then constructed via the trunks and central offices of the network between the calling and called stations. The receiving central office then provides a ringing signal to the called station and sends ringback tone back through the connection to the calling station.

Figure 3:
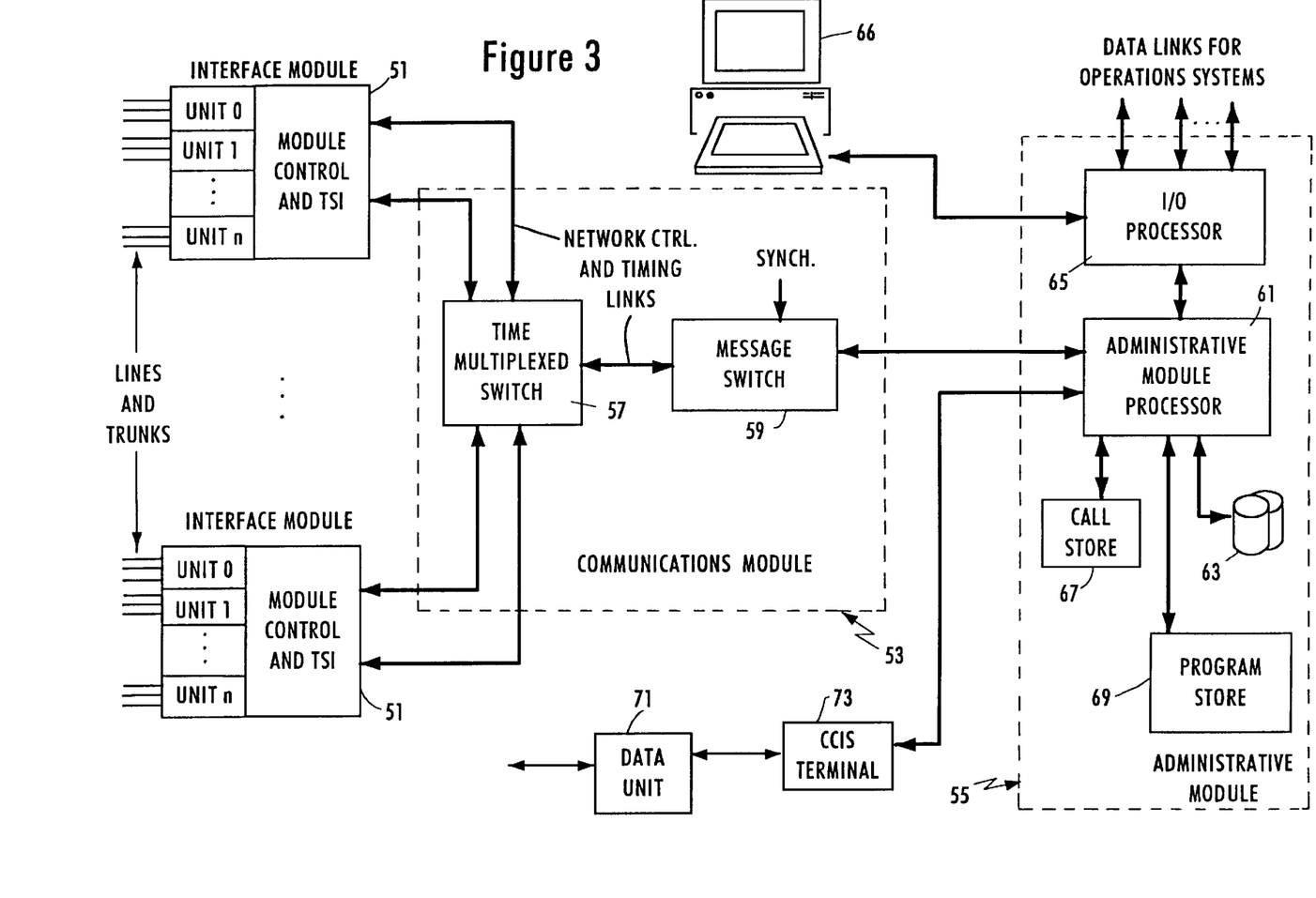
FIG. 3 is a diagram of one of the SSP type central offices used in the preferred intelligent network implementation of the present invention.

FIG. 3 is a simplified block diagram of an electronic program controlled switch which may be used as any one of the SSP type COs in the system of FIG. 1. As illustrated, the CO switch includes a number of different types of modules. In particular, the illustrated switch includes interface modules 51 (only two of which are shown), a communications module 53, and an administrative module 55.

The interface modules 51 each include a number of interface units 0 to n. The interface units terminate lines from subscribers'stations, trunks, T1 carrier facilities, etc. Where the interfaced circuit is analog, for example a subscriber loop, the interface unit will provide analog to digital conversion and digital to analog conversion. Alternatively, the lines or trunks may use digital protocols such as T1 or ISDN. Each interface module 51 also includes a digital service unit (not shown) which is used to generate call progress tones.

Each interface module 51 includes, in addition to the noted interface units, a duplex microprocessor based module controller and a duplex time slot interchange, referred to as a TSI in the drawing. Digital words representative of voice information are transferred in two directions between interface units via the time slot interchange (intramodule call connections) or transmitted in two directions through the network control and timing links to the time multiplexed switch 57 and thence to another interface module (intermodule call connection).

The communication module 53 includes the time multiplexed switch 57 and a message switch 59. The time multiplexed switch 57 provides time division transfer of digital voice data packets between voice channels of the interface modules 51 and transfers data messages between the interface modules. The message switch 59 interfaces the administrative module 55 to the time multiplexed switch 57, so as to provide a route through the time multiplexed switch permitting two-way transfer of control related messages between the interface modules 51 and the administrative module 55. In addition, the message switch 59 terminates special data links, for example a link for receiving a synchronization carrier used to maintain digital synchronism.

The administrative module 55 includes an administrative module processor 61, which is a computer equipped with disk storage 63, for overall control of CO operations. The administrative module processor 61 communicates with the interface modules 51 through the communication module 53. The administrative module 55 also includes one or more input/output (I/O) processors 65 providing interfaces to terminal devices for technicians such as shown at 66 in the drawing and data links to operations systems for traffic, billing, maintenance data, etc. A CCIS terminal 73 and an associated data unit 71 provide a signaling link between the administrative module processor 61 and an SS7 network connection to an STP or the like (see FIG. 1), for facilitating call processing signal communications with other CO's and with the ISCP 40.

As illustrated in FIG. 3, the administrative module 55 also includes a call store 67 and a program store 69. Although shown as separate elements for convenience, these are typically implemented as memory elements within the computer serving as the administrative module processor 61. For each call in progress, the call store 67 stores translation information retrieved from disk storage 63 together with routing information and any temporary information needed for processing the call. For example, for a switch based Centrex type service, the call store 67 would receive and store extension number translation information for the business customer corresponding to an off-hook line initiating a call. The program store 69 stores program instructions which direct operations of the computer serving as the administrative module processor.

Although shown as telephones in FIG. 1, the voice grade type terminals can comprise any communication device compatible with a voice grade type telephone line. As used herein, the term "telephone station" broadly encompasses telephones and any other devices compatible with a voice grade telephone circuit, for example, station devices such as facsimile machines, modems, etc. Also, although all of the links to the telephone stations are illustrated as lines, those skilled in communications arts will recognize that a variety of local transport media and combinations thereof can be used between the end office switches and the actual telephone stations, such as twisted wire pairs, subscriber loop carrier systems, radio frequency wireless (e.g., cellular) systems, etc.

Figure 4:
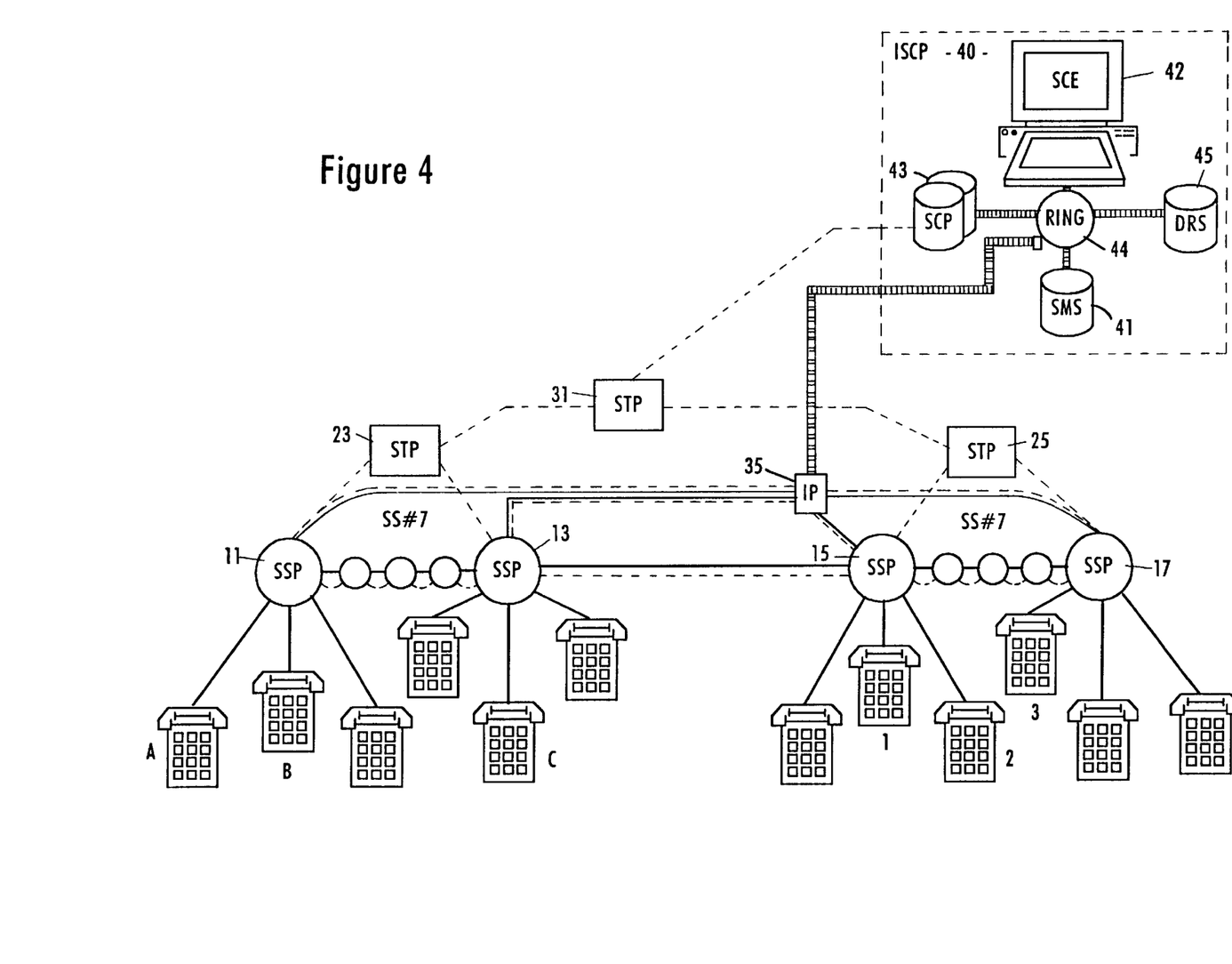
FIG. 4 is a schematic block diagram of the components of an Advanced Intelligent Network system arranged in one architecture according to one preferred embodiment of the invention.

FIG. 4 shows one preferred embodiment of a telecommunications network constructed according to the invention. This figure shows a network equipped with an advanced intelligent network signaling and control system of the same general type as previously described in connection with FIG. 1 and similar reference numerals have been used where applicable. As in the network shown in FIG. 1, all of the end office switches 11, 13, 15 and 17 in FIG. 4 are equipped and programmed to serve as SSPs. The components of the ISCP 40 are shown connected by an internal, high-speed data network, such as a token ring network 44.

Referring to FIG. 4 the network is shown as including a peripheral platform 435 of the relatively sophisticated type now referred to as "Intelligent Peripherals" or "IPs". The IP 435 is preferably connected to each of the SSPs 11, 13, 15, and 17 by an F link shown as broken lines. The IP is also connected to the SSPs by voice lines shown as solid lines.

These F link and voice connections may be provided to the associated SSP switches via a primary rate Integrated Services Digital Network (ISDN) link through an appropriate interface unit in one of the interface modules 51 of the switch (see FIG. 3). The ISDN link carries both the voice and signaling data.

The IP also is connected to the ISCP via a generic data interface (GDI). The GDI command set is simple and generic, and the commands can carry the desired amount of data. Also, the ISCP can initiate communications using GDI. This permits a wider variety of routing and processing routines according to the invention. This connection to the ISCP is shown as made to the token ring 44. The SSPs are connected to one another by F links shown as broken lines. The GDI data communication link forms a second signaling connection separate from the SS7 network and the network of trunk circuits interconnecting the switching offices.

According to one feature of the invention, in response to a triggering event, the SSP may receive from the ISCP instructions to route a call in progress to the IP. However, rather than waiting for a subsequent query from the IP, the ISCP simultaneously with instructing the SSP also instructs the IP to prepare to receive a call on a particular circuit or for a particular type of processing. For example, for a call which might require speech recognition processing, the ISCP, knowing the identity of the calling party, would instruct the IP to retrieve appropriate recognition templates from memory. Other protocols could be used to permit either the ISCP or the IP to initiate communications.

Figure 5:
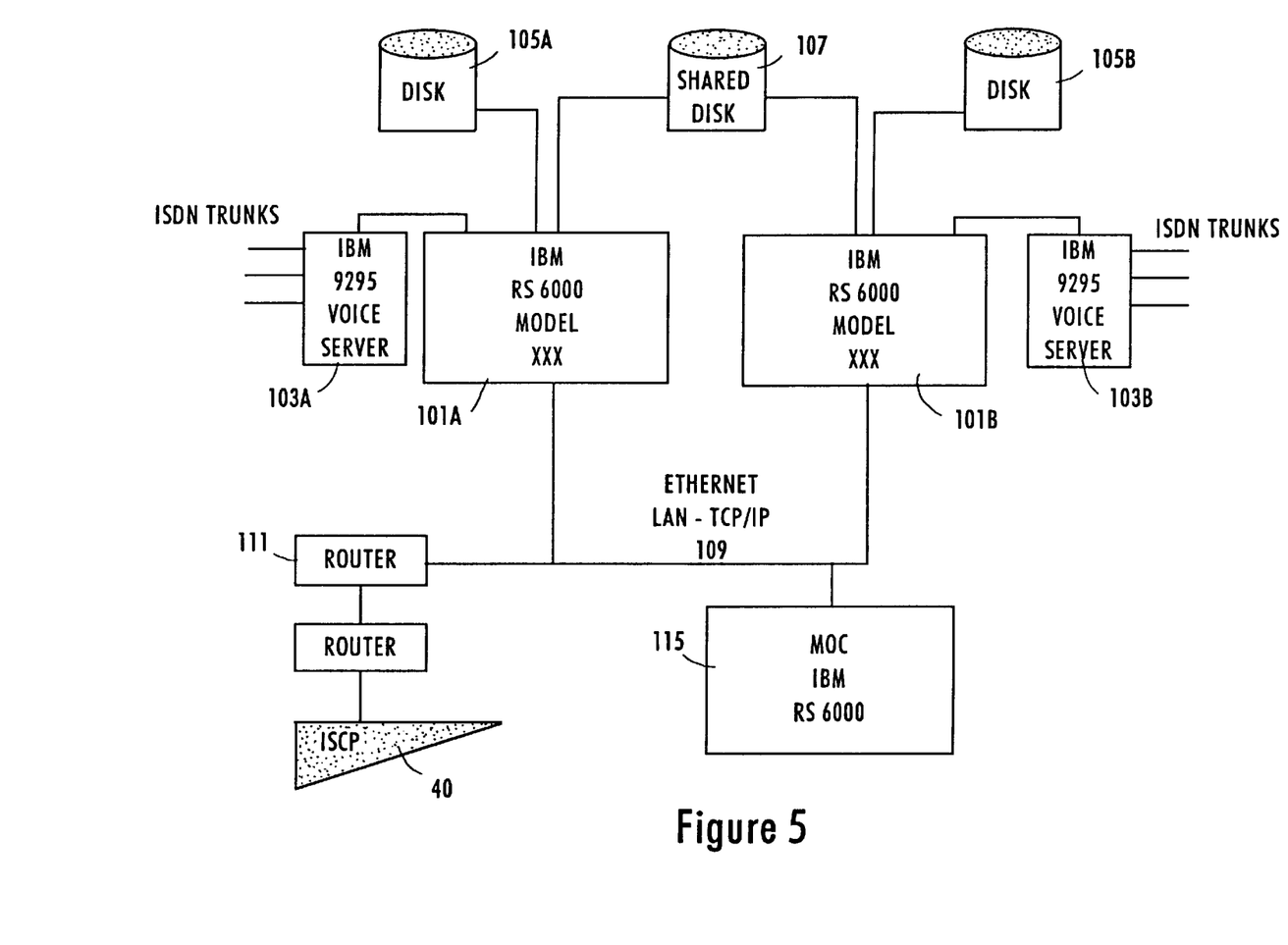
FIG. 5 is a schematic block diagram of one type of peripheral platform suitable for use in the system and method of the invention.

FIG. 5 illustrates a first, preferred embodiment of an IP for use in the network of FIG. 4. In this implementation, the IP will consist of two or more general purpose computers 101A, 101B, such as IBM RS6000s. Each general purpose computer will include a digital voice processing card for sending and receiving speech and other audio frequency signals, such as an IBM D-talk 600. Each voice processing card will connect to a voice server card 103A or 103B which provides the actual interface to T1 or primary rate interface ISDN trunks to the SSP type switching office. The plurality of computers may have associated dedicated disk storage 105A, 105B, and the IP will include a shared disk memory 107. Each computer will also include an interface card for providing two-way communications over an internal data communications system, an Ethernet type local area network 109. The Ethernet carries communications between the individual computers and between the computers and a router which provides an interconnection to the second signaling communications network going to the ISCP. The IP may also include another general purpose computer 115 configured as a terminal subsystem, for use as a maintenance and operations center (MOC) and providing operations personnel access to the IP. The number of processors provided in the IP and the number of voice servers will depend on project service demands. One additional processor and associated voice server will be provided as a backup.

Each general purpose computer 101A, 101B will run a node manager, an IP/ISCP Interface program, appropriate voice processing software, and a variety of application software modules to offer the proposed services of the IP. The central administrator or "Node Manager" program module, running on each computer, will monitor and control the various IP resources and operations.

The digital voice processing card and associated software will provide speech synthesis, speech recognition capabilities and DTMF tone signal reception, for use in a number of different applications. The speech synthesis and DTMF tone signal reception, for example will replace the announcement and digit collection functions of the SSP switches in various existing AIN services. The general purpose computers and associated circuits will also run a variety of other types of service program modules, for example a voice mail server module and/or a fax mail server module.

Figure 6:
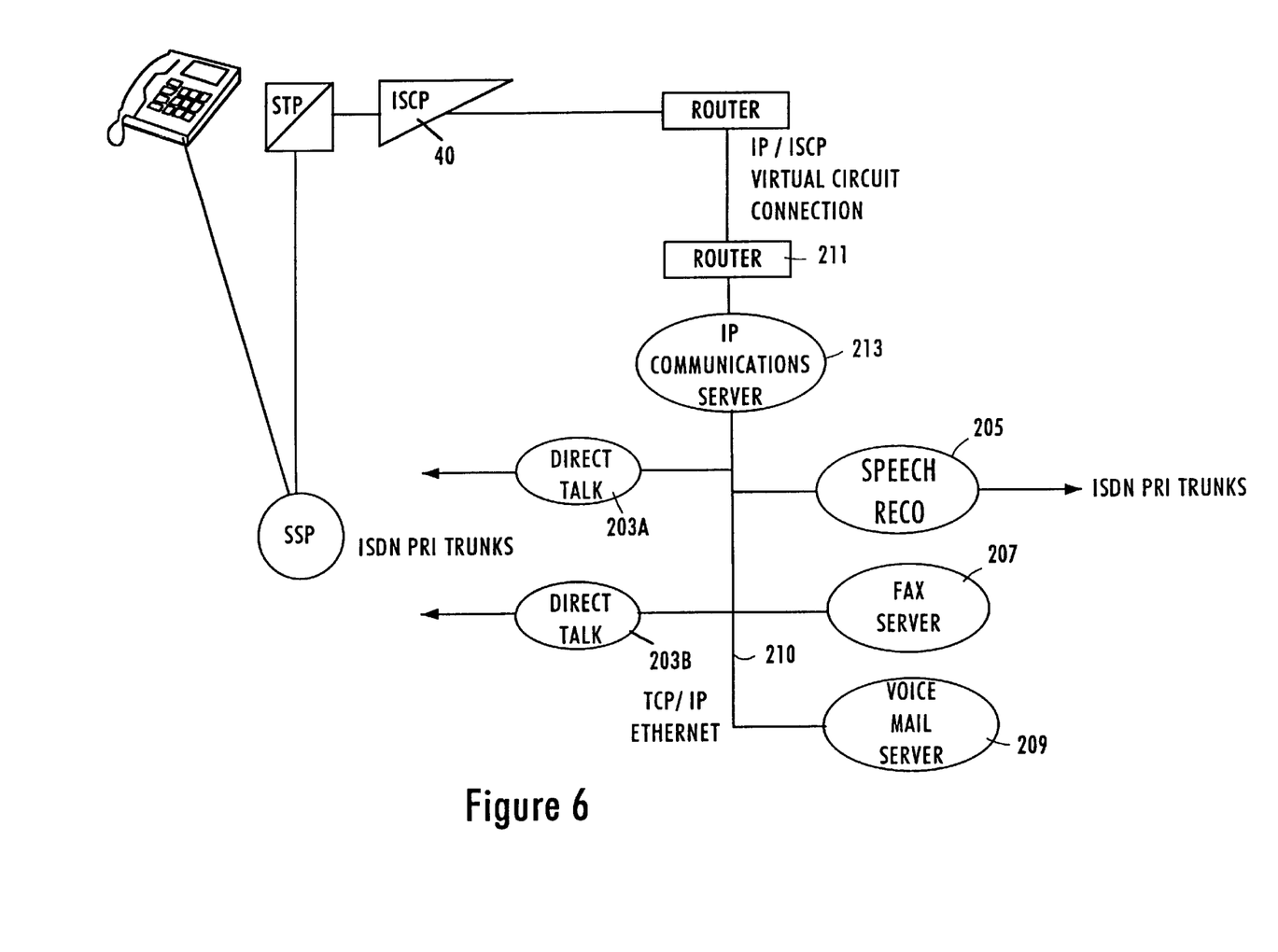
FIG. 6 illustrates an alternate embodiment of IP suitable for use in the system and method of the invention.

FIG. 6 illustrates an alternate embodiment of the IP used in the network of FIG. 4. The alternate architecture utilizes separate modules for different types of services or functions, for example, one or two Direct Talk type voice server modules 203A, 203B for interfacing the trunk to the SSP, a separate module 205 for speech recognition, a server module 209 for voice mail, and another server 207 for fax mail services, etc. The various modules communicate with one another via an data communication system 210, which again may be an Ethernet type local area network.

The Direct Talk modules 203A, 203B provide voice message transmission and dialed digit collection capabilities, as in the earlier embodiment. The modules 203A, 203B also provide line interfaces for communications to and from those servers which do not incorporate line interfaces. For example, for facsimile mail, the Direct Talk module connected to a call would demodulate incoming data and convert the data to a digital format compatible with the internal data communication network 210. The data would then be transferred over network 210 to the fax server 207. For outgoing facsimile transmission, the server 207 would transfer the data to one of the Direct Talk modules over the network 210. The Direct Talk module would reformat and/or modulate the data as appropriate for transmission over the ISDN link to the SSP. The Direct Talk modules provide a similar interface function for the other servers, such as the voice mail server 209.

The illustrated IP also includes a communication server 213. The communication server 213 connects between the data communication system 210 and the router 211 which provides communications access to the second signaling communication system and the ISCP 40 and other IPs which connect to that signaling communication system. The communication server 213 controls communications between the modules within the IP and the second signaling communication system.

In each of the proposed architectures, the SSP switch would route calls to the different elements of the IP in response to instructions from the ISCP. In the initial implementation using general purpose computers (FIG. 5), each of which offers all service functionalities, the decision to route to a particular one of the computers would be a resource availability/allocation decision. If necessary data can be exchanged between the computers via the internal data communications network, e.g., if a message for a particular subscriber's service is stored in the disc memory associated with one computer but the other computer is actually processing the call. In the second implementation (FIG. 6), however, the ISCP would instruct the SSP to route the call to the particular line to the specific module capable of providing a calling customer's individual service. For example, if the subscriber has some form of speech recognition service, the call would be routed to the speech recognition module 205. If the subscriber has a voice mail service, however, the ISCP would instruct the SSP to route the call to one of the lines going to one of the voice server modules 203A, 203B. The module 203A, or 203B would receive outgoing voice messages from the voice mail server 209 for transmission to the caller. The module 203A or 203B would decode DTMF signals and supply appropriate data to the voice mail server, for control purposes. The module 203A or 203B would also format incoming voice messages for transmission over internal network 210 and storage by server 209.

In an Advanced Intelligent Network (AIN) type system, such as shown in FIG. 1, certain calls receive specialized AIN type processing under control of data files stored in the SCP database 43 within the ISCP 40. In such a network, the SSP type local offices of the public telephone network include appropriate data in the translation tables for customers subscribing to AIN services to define certain call processing events identified as AIN "triggers". Using the translation table data from disc memory 63, the SSP will detect such triggering events during processing of calls to or from such AIN service subscribers.

The SSP type switches can recognize a variety of events as triggers for activating a query and response type AIN interaction with the ISCP. A number of different AIN triggers are used, depending on the precise type of service the AIN will provide a particular subscriber. For example, if a subscriber has a speech responsive autodialing service, an off-hook immediate trigger might be stored in the translation table file for that subscriber in the SSP. The SSP would detect the trigger each time the subscriber goes off-hook on that line and then attempt to obtain further instructions from the ISCP.

In a first mode of operation, an SSP type office (CO or tandem) which detects a trigger will suspend call processing, compile a TCAP formatted call data message and forward that message via a common channel interoffice signaling (CCIS) link and STP(s) to the ISCP 40 which includes the SCP database 43. The ISCP accesses its stored data tables to translate the received message data into a call control message and returns the call control message to the triggered SSP via CCIS link and STP(s). The SSP then uses the call control message to complete the particular call through the network.

For AIN calls requiring a processing feature provided by the peripheral platform according to the invention, the call control message would instruct the SSP to route the call to the associated peripheral platform. In the network of FIG. 4, the ISCP 40 transmits a "SEND to RESOURCE" type TCAP message instructing an SSP, such as SSP 17, to access a resource and collect digits. This message identifies a particular resource, in this case the link to the associated peripheral announcement platform 17A. This link comprises a primary rate Integrated Services Digital Network (ISDN) link which provides both a voice channel and a data channel. Each time the ISCP sends such a "SEND to RESOURCE" message to an SSP, the ISCP concurrently sends a message through the GDI data link to the associated peripheral announcement platform. In the case of a voice recognition situation this message tells the platform what template to select and what message to play on the specified ISDN channel following connection of the caller to the IP. The SSP responds to its instruction and routes the call to the IP.

In providing a voice autodialing service, the caller, who subscribes to the appropriate voice recognition calling service, may speak the identity of the party to be called, such as "Mom." The subscriber has previously created a set of speaker dependent templates which are stored at the IP and which provide the translation from "Mom" for that particular caller to the desired directory number. The ISCP has proactively alerted the IP as to the resources which it must call up and thus has obviated the need for an inquiry from the IP to the ISCP. Thus the IP, responding to the proactive instruction signal from the ISCP, has the proper template selected and waiting for the command of the caller.

Figure 7:
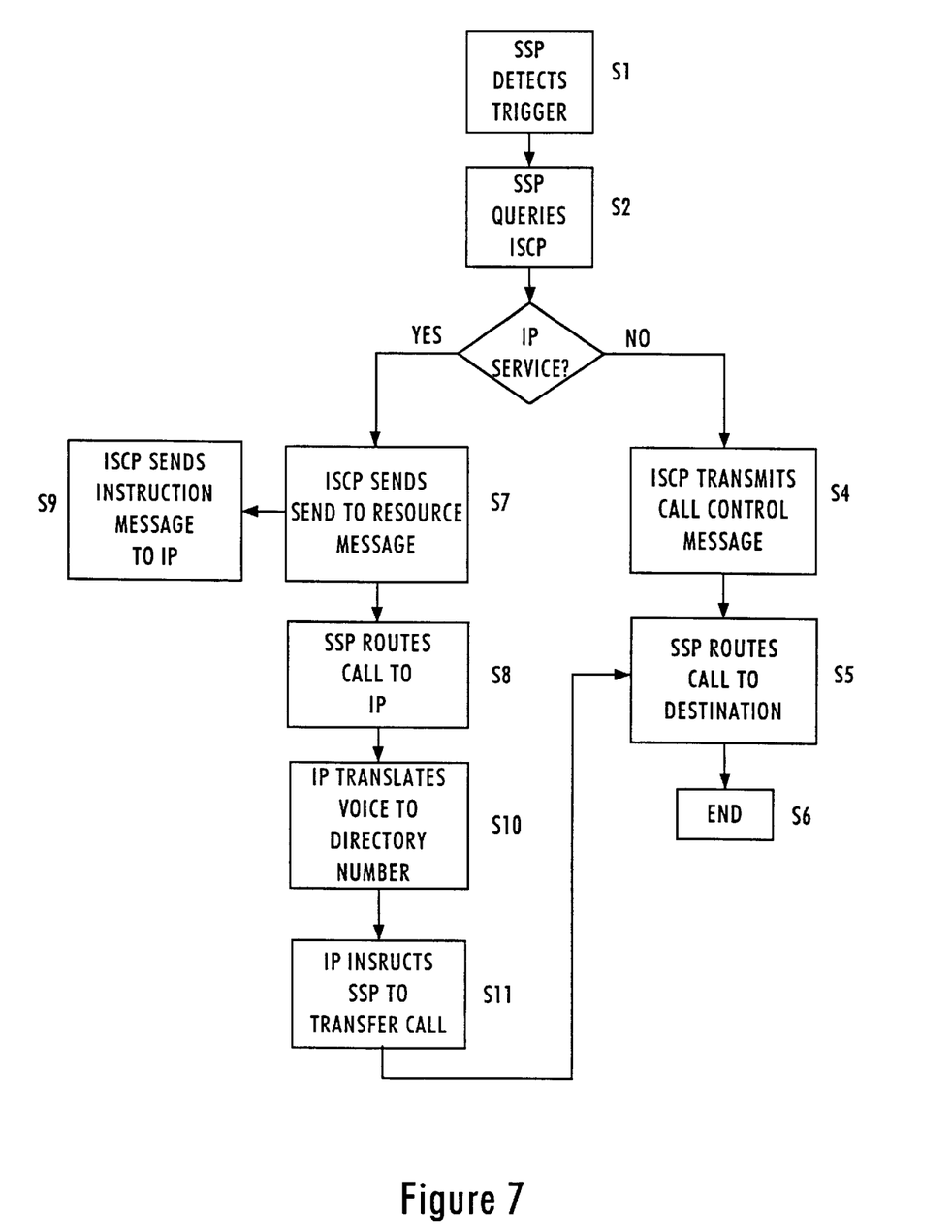
FIG. 7 is a flow chart illustrating one mode of operation according to the invention.

The IP, upon translating the command "Mom," instructs the SSP to transfer the call. The SSP may then route the call to the designated destination using the common channel signaling network and its STPs. Alternatively, according to the invention, the signaling necessary to determine the availability of the called station may be accomplished via the CO to CO F link path. This latter procedure eliminates the need for creating traffic on the common channel signaling network and assists in preventing overloads which may have the capacity to bring down the telco network. The foregoing two alternate procedures are illustrated in the flow charts shown in FIGS. 7 and 8, respectively.

As noted above, calls requiring some form of AIN service processing will include an event detectable as a trigger. In the call illustrated in FIGS. 7 and 8 this would be an off-hook on a line for a subscriber to a speech recognition dialing service. The processing illustrated in FIG. 7 begins at some point during call processing when an SSP detects the event identified as a trigger (S1), which may be an off-hook trigger.

In response to trigger detection, the SSP queries the ISCP for further instructions (S2). More specifically, the SSP type central office (CO) suspends the call and sends a query message to the ISCP via one or more STPs (see FIG. 1 or FIG. 4). This query message is in the above described TCAP format for an initial query from an SSP. The query message includes a substantial amount of relevant information, including in this instance the identification of the telephone line from which the party originated the call. The originating SSP sends the TCAP query via a CCIS link to an STP. The STP recognizes that the TCAP query is addressed to the ISCP and retransmits the query, either directly or through a further STP, and the SS7 links to the ISCP.

The ISCP 40 uses information contained in the TCAP query message to access data tables stored in the SCP database 43. The ISCP uses data from the retrieved tables to translate the information from the TCAP query into an appropriate instruction for the SSP. At this point, the instruction will take a different form depending on whether or not the relevant AIN service requires some processing feature provided by the IP. If the service does not call for an IP feature, processing branches from step S3 to step S4, wherein the ISCP transmits a call control message to the SSP via the STPs of the SS7 signaling network.

In the simplified example here, it is assumed that the non-IP type service involves only a direct routing to a destination, without any further processing by the SSP. The message from the ISCP, in TCAP format, therefore specifies an actual destination number and provides any necessary associated routing instructions, such as a preferred trunk group identification, from the data tables. At step S5, the SSP executes normal call processing routines for completing the call using the destination telephone number and/or routing information received from the ISCP, and call processing ends at step S6.

Returning to step S3, if the service identified in response to the information in the original TCAP query message requires one or more call processing functions of the IP, as in this illustration of an embodiment of the invention, processing branches to step S7. At this point, the ISCP transmits a "SEND TO RESOURCES" type TCAP message or a similar message back to the SSP via the STPs of the SS7 signaling network. This message would include sufficient information to route the call to one of the lines going to a voice server interface within the IP. If the IP connects directly to the SSP, the SSP simplyactivates appropriate internal switching elements to establish the call connection channel between the caller and the IP at S8. If the IP does not connect to the particular SSP, the instruction will provide sufficient information to route the call through other switching systems to the IP.

At the same time that the ISCP transmits the SEND TO RESOURCE message to the SSP, it also sends a message to the IP alerting the IP and instructing it to select a particular resource, which in this case is a voice template (S9). The identity of the template is established for the IP by the identity of the calling line which the ISCP obtained from the original SSP inquiry. At S9 the ISCP instructs the IP to perform a voice recognition and translation function.

The SSP responds to its instructions from the ISCP and routes the call to the IP at S8. The IP complies with its instructions from the ISCP and translates the voice message "Mom" into a directory number (S10). At S11 the IP instructs the SSP to transfer the call and the SSP routes the call at S5.

Figure 8:
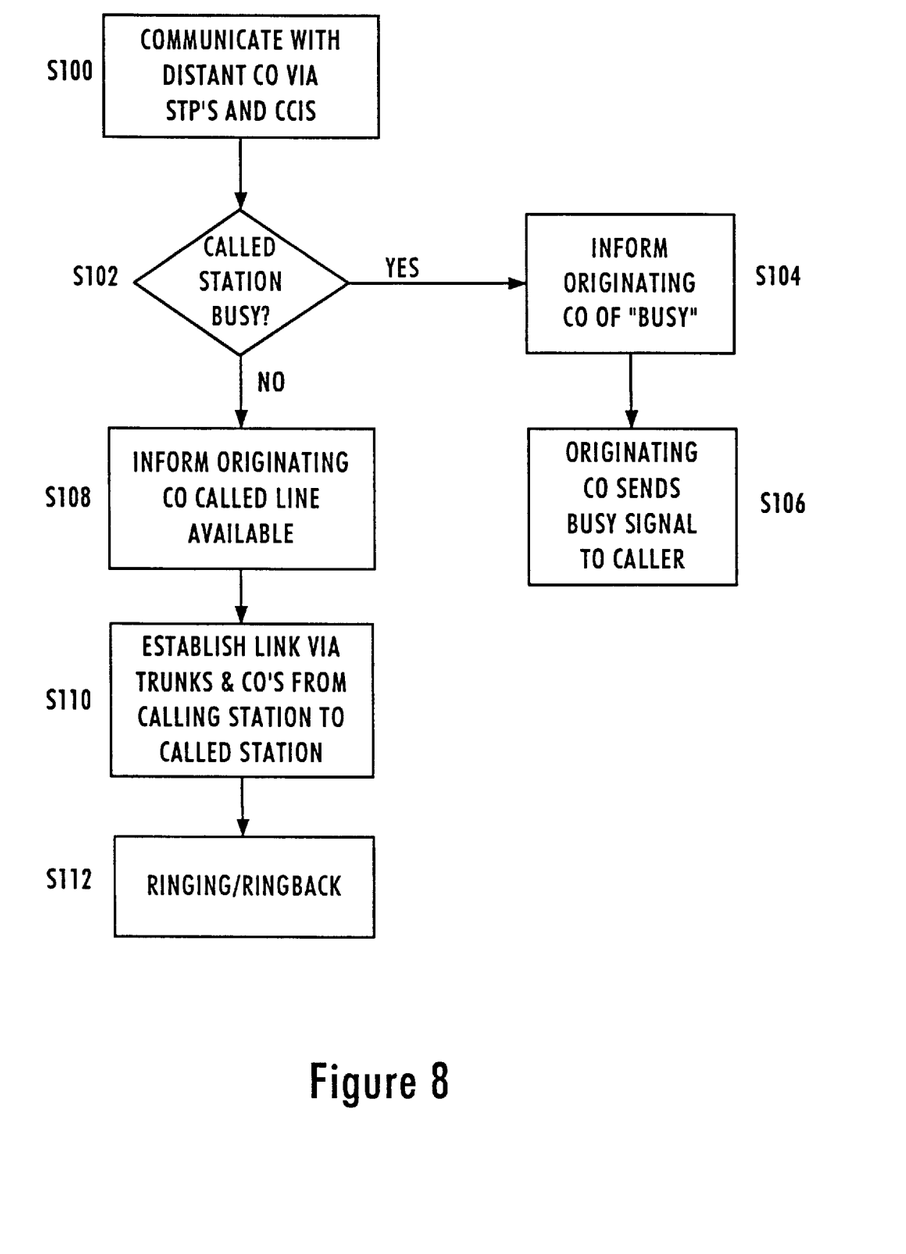
FIG. 8 is a flow chart illustrating another mode of operation according to the invention.
Figure 9:
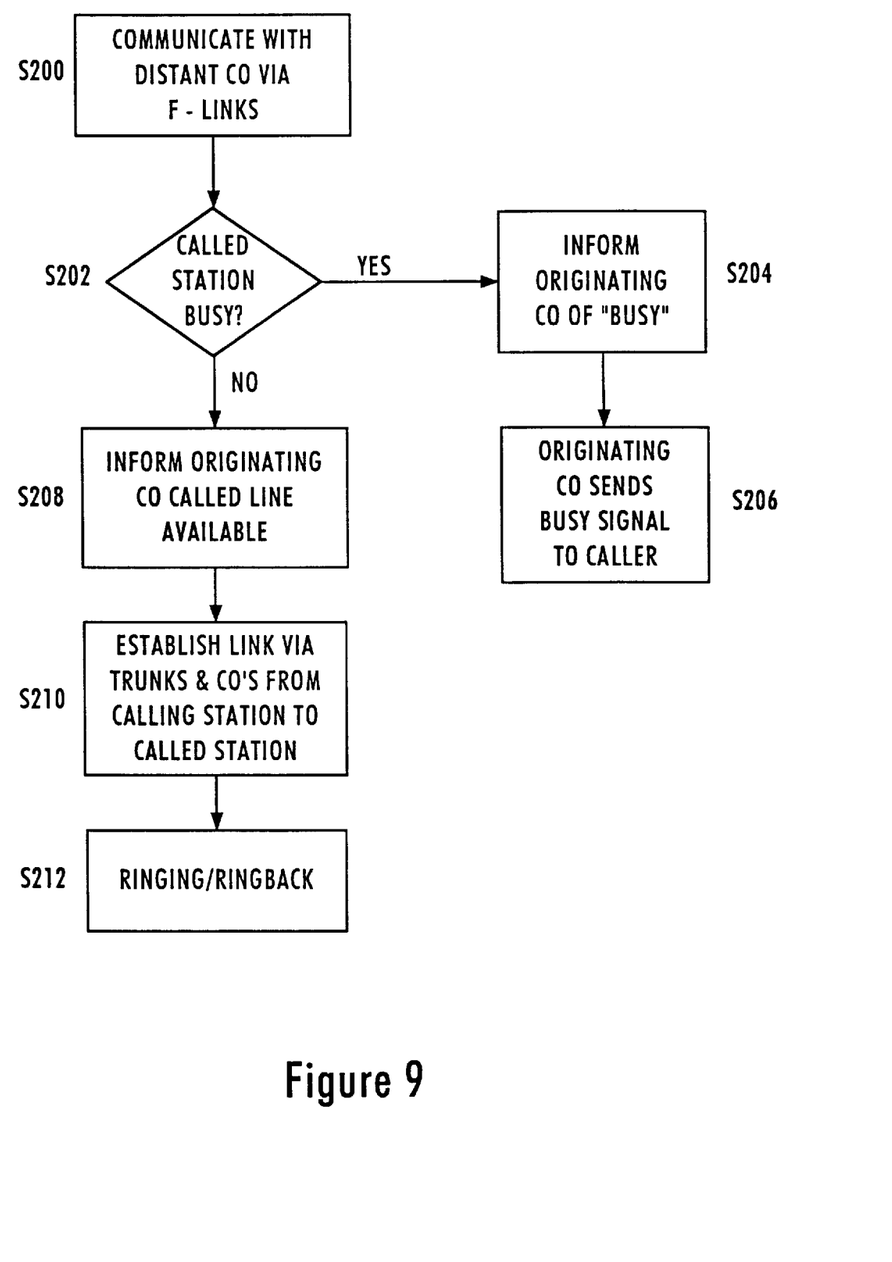
FIG. 9 is a flow chart illustrating still another mode of operation according to the invention.

The routing includes the steps shown in the flow diagram of FIG. 8. The SSP communicates with the distant CO via STPs and CCIS (S100) and at S102 determines whether or not the called station is busy. If the station is busy the originating CO is informed (S104) and the originating CO sends a "busy" signal to the caller (S106). If the called station is not busy the originating CO is informed (S108) and the originating SSP establishes a link via trunks and COs from the calling station to the called station (S110). Ringing and ringback signals are thereupon transmitted (S112). FIG. 9 shows the procedure where the routing to destination occurs via the F link alternative of the invention.

According to a still further feature of the invention the routing to destination may be implemented in the IP. As will be seen from FIG. 4 the IP is provided with F links to all or virtually all of the central office switches with which it is associated. This arrangement may be utilized to ascertain the availability of the called station through the IP followed by routing of the call using the general purpose computers available in IPs such as the one illustrated in FIG. 5. Such a procedure eliminates the need for use of the common channel signaling channels for that purpose and lightens the load on the STPs.

Yet another feature of the invention for limiting traffic on the common channel signaling network is the use of SSP triggers which produce feature specific TCAP messages which are delivered directly to a general purpose computer IP. Such messages contain therein sufficient task identifying content to enable the IP to return to the SSP all information necessary to routing of the call. Such call management may be implemented using prefix digits or characters to not only trigger the switch or SSP but also to provide information to be incorporated in the TCAP signal which the switch sends to the IP. This information is then read by the IP computer as directing the IP to perform a particular call processing function.

By way of example, subscribers to voice autodialing may be instructed to preface all such calls by dialing "*". When the caller goes off-hook the local SSP recognizes a trigger and when the "*" is dialed it is instructed to send the TCAP message to the IP over the F link. It is further instructed by the same occurrences that it is to incorporate in that TCAP message certain information which will instruct the IP as to the call processing to be conducted. The IP reads the TCAP message, which contains the identity of the calling line, and knows from the additional instructional information that it is to perform, by way of example, a voice recognition autodialing function for the identified calling line. This information identifies the necessary template which the IP then retrieves and uses to effect a translation from the user spoken command to the directory number associated with "Mom" for this caller. Call routing may then be effected via the common channel signaling network, via the F links from the IP to the COs, or via the F links between the COs.

Although several preferred embodiments of the invention have been described in detail above, it should be clear that the present invention is capable of numerous modifications as would be apparent to one of ordinary skill in the art. Such modifications fall within the purview of the appended claim.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. A communication network, comprising:

local communication lines;

a plurality of separately located central office switching systems interconnected via trunk circuits for selectively providing switched call connections between at least two of the local communication lines;

a services control point, separate from the central office switching systems, comprising a database storing call processing data associated with a plurality of the local communication lines for control of call processing through one or more of the central office switching systems;

a first signaling communication system for two-way communications of data messages, said first signaling communication system interconnecting the central office switching systems and connecting the central office switching systems to the services control point;

a peripheral platform connected to at least one of the central office switching systems via a call connection channel, said peripheral platform comprising means for providing at least one auxiliary call processing capability via the call connection channel;

a second signaling communication system, separate from the first signaling communication system and the central office switching systems, for providing two-way communications of data messages between the peripheral platform and the services control point to control provision of the at least one call processing capability by the peripheral platform; and a third signaling communication system, separate from the first and second signaling communication systems and the central office switching systems, for providing two-way communications of data messages between the peripheral platform and the central office switching system connected to the peripheral platform via a call connection channel to control the provision of the at least one call processing capability by the peripheral platform.

2. A network as in claim 1, wherein said local communication lines comprise telephone lines, and said central office switching systems comprise telephone switches.

3. A network as in claim 1, wherein said peripheral platform comprises means for recognizing voices, translating spoken words to directory numbers, and transmitting data messages containing said directory numbers to the central office switching system connected to the peripheral platform via the third signaling communication system.

4. A network as in claim 1, wherein said peripheral platform comprises means for recognizing voices, translating spoken words to directory numbers, and transmitting data messages containing said directory numbers to the central office switching system connected to the peripheral platform via the third signaling communication system to effect transfer of a call from said peripheral platform to a station identified by said directory numbers.

5. A network as in claim 1, wherein said first signaling communication system is a common channel interoffice signaling network.

6. A network as in claim 5, wherein said second signaling communication system is a generic data interface (GDI) network.

7. A network as in claim 5, wherein said local communication lines comprise telephone lines, and said central office switching systems comprise telephone switches interconnected to each other by voice telephone type trunk circuits separate from said common channel interoffice signaling system.

8. A network as in claim 1, wherein said third signaling communication system comprises at least one F link.

9. A network as in claim 1, wherein said peripheral platform is connected to a plurality of the central office switching systems via a plurality of links of said third signaling communication system for providing two-way communications of data messages between the peripheral platform and the plurality of central office switching systems.

10. A network as in claim 9, wherein said links of said third signaling communication system comprise F links.

11. A communication network, comprising:

local communication lines;

a plurality of separately located central office switching systems interconnected via trunk circuits for selectively providing switched call connections between at least two of the local communication lines;

a services control point, separate from the central office switching systems, comprising a database storing call processing data associated with a plurality of the local communication lines for control of call processing through one or more of the central office switching systems;

a first signaling communication system for two-way communications of data messages, said first signaling communication system interconnecting the central office switching systems and connecting the central office switching systems to the services control point;

a peripheral platform connected to at least one of the central office switching systems via a call connection channel, said peripheral platform comprising means for providing at least one auxiliary call processing capability via the call connection channel;

a second signaling communication system, separate from the first signaling communication system and the central office switching systems, for providing two-way communications of data messages between the peripheral platform and the services control point to control provision of at least one call processing capability by the peripheral platform;

a third signaling communication system, separate from the first and second signaling communication systems and the central office switching systems, for providing two-way communications of data messages between the peripheral platform and the central office switching systems; and a fourth signaling communication system, separate from the first and second signaling communication systems and the central office switching systems, for providing two-way communications of data messages directly between the central office switching systems.

12. A network as in claim 11, wherein said fourth signaling communication system comprises F links connecting central office switching systems directly to one another.

13. A network as in claim 12, wherein said fourth signaling communication system F links carry SS7 signals to establish a call connection without use of said first signaling communication system.

14. A network as in claim 13, wherein said call connection is established under the control of said peripheral platform without use of said first signaling communication system.

15. A network as in claim 11, wherein said third signaling communication system linking said peripheral platform to said central office switching systems carries SS7 signals to establish a call connection without use of said first signaling communication system.

16. In a communication system comprising:

at least two switching offices, interconnected by trunk circuits, for selectively providing switched communication services over a plurality of communication lines connected thereto;

a central control separate from the switching offices, said central control comprising a database storing call processing data associated with a plurality of said communication lines for control of call processing through one or more of said switching offices; and a first signaling communication system for two-way communication of messages, said first signaling communication system interconnecting the switching offices and connecting the switching offices to said central control;

a call processing method comprising the steps of:
 receiving a request for service via a first one of the communication lines and a first of said switching offices;
 sending an inquiry signal from said first switching office to said central control via said first signaling communication system;
 substantially simultaneously sending from said central control (a) instructions to said first switching office for connection, and (b) instructions to a peripheral platform to identify an auxiliary call processing function to be executed by said peripheral platform responsive to said request for service;
 providing a data and a call connection from said one of the communication lines to said peripheral platform in response to said (a) instructions;
 executing the identified auxiliary call processing function via said call connection; and
 transferring the call connection from the peripheral platform to a destination communication line identified by information provided by the peripheral platform.

17. A method as set forth in claim 16 including the step of completing the call over the destination communication line using F link signaling.

18. A method as set forth in claim 17 wherein said F link signaling is carried out at least partially between the peripheral platform and the second of said switching offices to which said destination communication line is connected.

19. A method as set forth in claim 17 wherein said F link signaling is carried out between the peripheral platform and the first and second of said switching offices.

20. A method as set forth in claim 19 wherein said F link signaling is carried out over F links connecting intermediate switching offices between said first and second switching offices.

21. A communication network, comprising:

central office switching systems interconnected by trunks for selectively providing switched call connections;

a services control point, separate from the central office switching systems for control of call processing through one or more of the central office switching systems;

a first data signaling system interconnecting the central office switching systems and connecting the central office switching systems to the services control point;

a peripheral platform connected to at least one of the central office switching systems via a call connection channel for providing at least one auxiliary call processing capability via the call connection channel;

a second data signaling system, separate from the first data signaling system and the central office switching systems connecting the peripheral platform and the services control point to control provision of the at least one call processing capability by the peripheral platform; and a third data signaling system, separate from the first and second data signaling systems and the central office switching systems, connecting the peripheral platform and the central office switching system connected to the peripheral platform via a call connection channel to control the provision of the at least one call processing capability by the peripheral platform.

22. A network as in claim 21, wherein said first data signaling system is a common channel interoffice signaling network.

23. A network as in claim 21, wherein said third data signaling system comprises at least one F link.

* * * * *